Patented May 22, 1945

2,376,510

UNITED STATES PATENT OFFICE 2,376,510

ADHESIVE AND METHOD OF MAKING THE SAME

Seymour G. Saunders, Bloomfield Hills, and Harry Morrison, Detroit, Mich., assignors to Chrysler Corporation, Highland Park, Mich., a corporation of Delaware No Drawing. Application January 15, 1941, Serial No. 374,456

5 Claims. (Cl. 260—755)

This invention relates to an improved adhesive and method of making the same.

More particularly, the invention pertains to an improved adhesive which is adapted for use in connecting together parts of an assembly including rubber and rubber-like substances or numerous other materials such as wood, fiber, fabric, metal and the like.

One of the main objects of the invention is the provision of an improved plasticizing agent in a cement of this kind which will not polymerize, oxidize or otherwise lose its plasticizing properties when exposed to heat or upon aging of set deposits of the adhesive.

A further object of the invention is the provision of a plasticizing material of this character which also serves as a peptizing agent in preventing jelling of adhesives of the type that contain a relatively large proportion of asphalt.

A still further object of the invention is the provision in an adhesive of a plasticizing and peptizing agent which is also a solvent for rubber.

An additional object of the invention is the provision in an adhesive of this kind of a plasticizer which produces tackiness in the unset cement and which has a comparatively high fire flash point.

We have found that the foregoing objects may be accomplished and other advantages obtained in the manufacture of adhesives by incorporating therein an extract from the lubricating oil fraction of petroleum, commercially known as "Duosol" and referred to as "solvent tar" in Patent No. 2,144,694, wherein is described the process by which it is derived. Duosol is an aromatic extract from the lubricating oil fraction of petroleum obtained by extraction with any one or a combination of solvents of the group including phenol, cresylic acid, liquid sulphur dioxide, dichloroethylether, nitrobenzene, chloraniline, benzyl alcohol, furfural and phenetidine. It is preferable to remove considerable of the wax and asphalt from the lubricating oil fraction before extracting the "solvent tar" therefrom by treating the oil with liquid propane. As set forth in the above mentioned patent, this extraction may be conducted by subjecting the lubricating oil fraction to simultaneous countercurrent contact with two solvents flowing in opposite directions, one solvent being propane and the other cresylic acid or any of the other foregoing solvents or combinations thereof. Equal parts of phenol and cresylic acid are particularly suitable for the extracting operation.

The solvent dissolves or extracts from the dewaxed and deasphalted lubricating oil fraction, aromatics which can be derived in substantially concentrated form by separating the layer of aromatic bearing solvents from the residual layer of the lubricating oil fraction and then removing the solvent therefrom by steam distillation. The resulting extract, designated herein and in the art as "solvent tar," has substantially the same characteristics when extracted with any of the foregoing solvents or combinations thereof.

Solvent tar is particularly adapted for plasticizing adhesives and cements which include rubber and asphalt for, while it has a materially higher plasticizing and tackifying value than plasticizers conventionally used in adhesives of this kind, it also peptizes the asphalt content of the cement thus preventing jelling, and since it is a solvent for rubber, it also aids in mixing and incorporating the rubber with the other materials of the adhesive compound. This extract does not polymerize or readily oxidize at temperatures to which adhesives are normally subjected in use or in setting. Adhesives in which this extract is employed as a plasticizer, therefore, do not become brittle upon aging but maintain a high strength value for a prolonged length of time. This plasticizer is particularly effective during the application of the adhesive for it retains the unset compound in a strongly tacky state after preliminary drying preceding assembly of the parts to be adhered together.

The solution of some of the rubber content of the adhesive in the solvent tar extract reduces the quantity of volatile solvent required to bring the adhesive to a predetermined viscosity. Therefore, the percentage of solids, the portion of the adhesive which remains after the volatile vehicle is removed in setting an adhesive of predetermined viscosity is increased by the use of this extract as a plasticizer and peptizing agent.

While solvent tar may be used to advantage in adhesives of diverse compositions, it is particularly adapted to plasticize and peptize an adhesive of the following composition:

|  | Percent |
|---|---|
| Asphalt (280° F. melting point) | 28 |
| Limed rosin (4 parts lime to 100 parts colophony) | 10 |
| Raw rosin (colophony) | 4.2 |
| Solvent tar (Duosol) | 21.3 |
| Rubber scrap | 36.5 |

Percentage of vulcanizing and accelerating agents based on the total of the above composition

|  | Percent |
|---|---|
| Sulphur | 3.9 |
| Ferric oxide | 4.4 |
| Lime | 3.4 |
| Zinc oxide | 3.4 |

The sulphur serves as a rubber vulcanizing agent and the ferric oxide, lime and zinc oxide serve as vulcanization accelerating agents. Any of the vulcanizing and accelerating agents conventionally employed in vulcanizing of rubber compounds may be used in place of the agents specified in the foregoing formula.

The adhesive is preferably compounded by initially heating and mixing together the asphalt, solvent tar, limed rosin and raw rosin to a temperature of from 450° F. to 460° F. This heating operation may be conducted in any suitable kettle in which the materials are thoroughly fused together while the rubber, preferably in the form of tire scrap or mechanical rubber scrap, is added in relatively small increments over a period of approximately twenty minutes. During this twenty minute period, the temperature of the batch is raised from the above mentioned temperature to substantially 480° F. at the end of the addition of the rubber. The batch is vigorously stirred throughout this portion of the process and the heating and stirring is continued while the batch is held at substantially 480° F. for thirty minutes after completion of the addition of rubber. At this stage of the process the batch is fairly homogeneous and thin.

The fused mass is then allowed to cool to substantially 320° F. and to it is added a mixture of the above mentioned vulcanizing and accelerating agents including the sulphur, ferric oxide, lime (preferably hydrated) and zinc oxide. The resulting batch is continuously stirred thereafter while heated from 320° F. to 325° F. for substantially thirty minutes. After this treatment, the resulting material has a heavy body.

The thus reacted batch, which constitutes the base of the adhesive, is then rapidly cooled by pouring it into cold water or by placing it in a cooling mill and it is then cut with a suitable solvent to a desired consistency. A suitable solvent may comprise a solution of alcohol and naphtha, ethyl alcohol forming substantially 5% of the weight of the naphtha. Other solvents or vehicles such as aviation gasoline and similar hydrocarbons may be used for this purpose. The amount of solvent added is optional and depends upon the desired viscosity. When naphtha and alcohol are employed, to the material derived after the last mentioned cooling step is preferably added substantially 80% of the total quantity of naphtha to be used and thereafter alcohol in an amount equal to substantially 5% of the total quantity of naphtha is thoroughly mixed with the naphtha cut product, the remaining 20% of the naphtha being added and thoroughly mixed thereafter.

Although specific proportions of the ingredients have been set forth in order to disclose a representative embodiment of the invention, it is obvious that various changes in the quantities of materials employed in the manufacture of the improved adhesive may be made.

Although but several specific embodiments of the invention have been herein described, it will be understood that various changes in the sequence of operations, steps and materials employed may be made without departing from the spirit of the invention.

We claim:

1. An adhesive comprising fused together rubber and asphalt, limed rosin and a plasticizing agent having a peptizing action on said asphalt and adapted to enter into solution with some of said rubber, said plasticizing agent consisting of a "solvent tar" comprising mainly dewaxed naphthenic extracts from the lubricating oil fraction of petroleum obtained by extraction with a solvent selected from the group of solvents consisting of phenol, cresylic acid, liquid sulphur dioxide, dichloroethylether, nitrobenzene, chloraniline, benzyl alcohol, furfural and phenetidine, said rubber, asphalt and "solvent tar" constituting the major portion of the solids of said adhesive and said "solvent tar" being present in sufficient quantity to plasticize said rubber and to peptize said asphalt and in an amount of the order of approximately one part of "solvent tar" to three parts of the total rubber and asphalt content, said rubber and asphalt each being present in an amount greater than the amount of said "solvent tar," and said rubber being present in an amount greater than the amount of said asphalt.

2. A cement including asphalt, limed rosin, rubber and a combined plasticizing rubber solvent and asphalt peptizing agent, said agent comprising mainly dewaxed naphthenic extracts from the lubricating oil fraction of petroleum obtained by extraction from a dewaxed lubricating oil fraction with phenol and cresylic acid, said rubber, asphalt and said agent constituting the major portion of the solids of said adhesive and being present in sufficient quantity to perform said plasticizing, peptizing and solvent actions and in an amount of the order of approximately one part thereof to three parts of the total of the rubber and asphalt content, said rubber and asphalt each being present in an amount greater than the amount of said agent, and said rubber being present in an amount greater than the amount of said asphalt.

3. The method of making an adhesive which comprises the steps of fusing together asphalt, a plasticizing agent having a peptizing action on said asphalt and adapted to enter into solution with rubber, said plasticizing agent consisting of a "solvent tar" comprising mainly dewaxed naphthenic extracts from the lubricating oil fraction of petroleum obtained by extraction with a solvent selected from the group of solvents consisting of phenol, cresylic acid, liquid sulphur dioxide, dichloroethylether, nitrobenzene, chloraniline, benzyl alcohol, furfural and phenetidine, limed rosin and raw rosin at a temperature of from 450° F. to 460° F., adding small increments of rubber to said fused mass while gradually increasing the temperature thereof to substantially 480° F. at the end of the rubber addition, said rubber, asphalt and plasticizing agent constituting the major portion of the solids of said adhesive and said plasticizing agent being present in an amount of the order of approximately one part thereof to three parts of the total rubber and asphalt content, said rubber and asphalt each being present in an amount greater than the amount of said agent, and said rubber being present in an amount greater than the amount of said asphalt, maintaining the resulting batch at substantially 480° F. until homogeneous, cooling said mass to a temperature suitable for vulcanizing the rubber thereof, vulcanizing the rubber of said mass by adding thereto conventional rubber vulcanizing agents and dissolving the resulting product in a volatile hydrocarbon solvent.

4. An adhesive base comprising the vulcanization reaction products of conventional rubber vulcanizing and accelerating agents and a fused mass of asphalt, rubber, limed rosin, raw rosin and a plasticizing agent having a peptizing action on said asphalt and adapted to enter into solution with some of said rubber, said plasticizing agent consisting of a "solvent tar" comprising mainly dewaxed naphthenic extracts from the lubricating oil fraction of petroleum obtained by extraction with a solvent selected from the group of solvents consisting of phenol, cresylic acid, liquid sulphur dioxide, dichloroethylether, nitrobenzene, chloraniline, benzyl alcohol, furfural and phenetidine, said rubber asphalt and plasticizing agent constituting the major portion of the solids of said adhesive and said plasticizing agent being present in an amount of the order of approximately one part thereof to three parts of the total rubber and asphalt content, said rubber and asphalt each being present in an amount greater than the amount of said plasticizing agent, and said rubber being present in an amount greater than the amount of said asphalt.

5. An adhesive comprising a solution in a volatile hydrocarbon solvent of the vulcanization reaction products of conventional rubber vulcanizing and accelerating agents and a fused mass of asphalt, rubber, limed rosin, raw rosin and a plasticizing agent having a peptizing action on said asphalt and adapted to enter into solution with some of said rubber, said plasticizing agent consisting of a "solvent tar" comprising mainly dewaxed naphthenic extracts from the lubricating oil fraction of petroleum obtained by extraction with a solvent selected from the group of solvents consisting of phenol, cresylic acid, liquid sulphur dioxide, dichloroethylether, nitrobenzene, chloroniline, benzyl alcohol, furfural and phenetidine, said rubber asphalt and plasticizing agent constituting the major portion of the solids of said adhesive and said plasticizing agent being present in an amount of the order of approximately one part thereof to three parts of the total rubber and asphalt content, said rubber and asphalt each being present in an amount greater than the amount of said plasticizing agent, and said rubber being present in an amount greater than the amount of said asphalt.

SEYMOUR G. SAUNDERS.
HARRY MORRISON.